(12) United States Patent
Kwon et al.

(10) Patent No.: US 7,848,863 B2
(45) Date of Patent: Dec. 7, 2010

(54) APPARATUS AND METHOD FOR PROVIDING AUDIO AND VIDEO CONTENT SERVICE IN VEHICLE

(75) Inventors: Kee Koo Kwon, Daejeon (KR); Gwang Su Kim, Daejeon (KR); Dong Sun Lim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 0 days.

(21) Appl. No.: 11/521,686

(22) Filed: Sep. 15, 2006

(65) Prior Publication Data

US 2007/0124041 A1    May 31, 2007

(30) Foreign Application Priority Data

Nov. 29, 2005    (KR) .................. 10-2005-0114721

(51) Int. Cl.
*G06F 7/00* (2006.01)
(52) U.S. Cl. .................. 701/36; 701/207; 701/213; 701/220
(58) Field of Classification Search .......... 701/28, 701/213, 36, 53, 60, 1–2; 116/58 A; 340/438, 340/457.3
See application file for complete search history.

(56) References Cited

U.S. PATENT DOCUMENTS

| | | | |
|---|---|---|---|
| 6,351,705 B1 * | 2/2002 | Yoshioka | 701/200 |
| 6,502,022 B1 * | 12/2002 | Chastain et al. | 701/36 |
| 7,239,947 B2 * | 7/2007 | Suzuki | 701/36 |
| 2002/0036572 A1 * | 3/2002 | Yamaki et al. | 340/933 |
| 2005/0116879 A1 * | 6/2005 | Arai | 345/1.1 |

FOREIGN PATENT DOCUMENTS

| | | | |
|---|---|---|---|
| JP | 2000-172195 | | 6/2000 |
| JP | 2003-298990 | | 10/2003 |
| KP | 1020000033660 A | * | 6/2000 |
| KR | 1998-044617 | | 9/1998 |
| KR | 2000-0033660 | | 6/2000 |
| KR | 2000-0046442 | | 7/2000 |
| KR | 10-0289611 | | 2/2001 |

* cited by examiner

*Primary Examiner*—Khoi Tran
*Assistant Examiner*—Bhavesh V Amin
(74) *Attorney, Agent, or Firm*—Blakely, Sokoloff, Taylor & Zafman

(57) ABSTRACT

An apparatus and a method for providing a video content service in a vehicle are provided. The apparatus includes a speed detection unit detecting a speed of the vehicle using a global positioning system, a status detection unit detecting a status of a parking brake, and a video control unit controlling one or more display apparatuses so that an the video contents are displayed when the speed of the vehicle is determined to be below a predetermined speed based on information on the detected status of the parking brake and the detected speed of the vehicle. According to the present invention, various video contents can be provided to a driver and passengers while safety driving of the vehicle and the driver's concentration on driving are maintained.

10 Claims, 4 Drawing Sheets

APPARATUS AND METHOD FOR PROVIDING AUDIO AND VIDEO CONTENT SERVICE IN VEHICLE

CROSS-REFERENCE TO RELATED PATENT APPLICATION

This application claims the benefit of Korean Patent Application No. 10-2005-0114721, filed on Nov. 29, 2005, in the Korean Intellectual Property Office, the disclosure of which is incorporated herein in its entirety by reference.

BACKGROUND OF THE INVENTION

1. Field of the Invention

The present invention relates to an apparatus and a method for providing audio and video content service, and more particularly, to an apparatus and a method for controlling one or more video display apparatuses installed in a vehicle.

2. Description of Related Art

Recently, various terminals having audio-visual capabilities such as a telematics terminal having a GPS receiver and a navigation terminal are installed in vehicles. These terminals provide drivers various functions such as guiding a vehicle to a desired destination by selecting a right route, playing music, watching television, displaying a still image or a moving picture.

However, when a driver watches television or a moving picture during driving, a possibility of a car accident is increased. Accordingly, an occurrence of the car accident can be prevented by not displaying video contents on a terminal monitor having audio-visual functions installed in the vehicle during driving.

As a conventional method to control the video contents displayed on the terminal monitor having audio-visual functions, there is a method in which operations of a foot brake, a transmission lever, and a parking brake of the vehicle are combined for the control of the display of the video contents. In other words, according to the conventional method, a driver should shift a transmission lever to a parking (P) level or a neutral (N) level or apply the parking brake after the vehicle is stopped by an operation of a brake of the vehicle, for displaying the video contents. Accordingly, when the controller detects the shift of the transmission lever to the P level or the N level or an operational status of the parking brake and transmits an operating signal to the terminal having audio-visual functions, the driver and passengers can watch the video contents displayed on a screen of the terminal having audio-visual functions. Alternatively, there is a method in which the video contents are displayed on the terminal monitor having audio-visual functions only when the vehicle is stopped by applying a foot brake of the vehicle.

In the conventional methods described above, there is an inconvenience in that the driver should operate the transmission lever or the parking brake repeatedly in a downtown traffic jam for watching the video contents on the monitor screen of the terminal having audio-visual functions. In addition, when only the foot brake is used for controlling the display, there is a problem in that the terminal having audio-visual functions is repeatedly turned on/off when the foot brake is pressed off/on during driving. In addition, in the conventional methods, passengers cannot watch the video contents through the monitor of the terminal having audio-visual functions, since display of the video contents is stopped during driving of the vehicle.

SUMMARY OF THE INVENTION

The present invention provides an apparatus and a method for providing a variety of video content services to a driver and passengers in a vehicle, while safety driving of the vehicle and the driver's concentration on driving are maintained.

According to an aspect of the present invention, there is provided an apparatus for providing video content service in a vehicle comprising: a speed detection unit detecting a speed of a vehicle using a global positioning system; a status detection unit detecting a status of a parking brake; and a video control unit controlling one or more display apparatuses so that video contents are displayed when the speed of the vehicle is determined to be below a predetermined speed based on information on the detected status of the parking brake and the detected speed of the vehicle.

According to another aspect of the present invention, there is provided a method of providing video contents in a vehicle, the method comprising: (a) detecting a speed of a vehicle using a global positioning system; (b) detecting a status of a parking brake; and (c) controlling one or more display apparatuses installed in the vehicle so that video contents are displayed when the speed of the vehicle is determined to be below a predetermined speed based on the detected status of the parking brake and the detected speed of the vehicle.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Now, embodiments of the present invention will be described in detail with reference to the accompanying drawings.

The present invention provides a new method in which video contents are continuously displayed on a monitor of a terminal when a parking brake is applied. When the parking brake is not applied, a speed of a vehicle is detected by a global positioning system (GPS) receiver installed in the vehicle. Whereas, when the speed of the vehicle is equal to or above a predetermined speed, a display on the monitor of the terminal having audio and visual functions installed in the vehicle is stopped. In addition, when monitors are installed in front and rear seats, respectively, various video content services can be provided to passengers during driving by not blocking a video signal to the monitor in the rear seat for the passengers while blocking the video signal to the monitor in the front seat instead of stopping the video content services to the monitor in the rear seat during driving.

Figure 1:
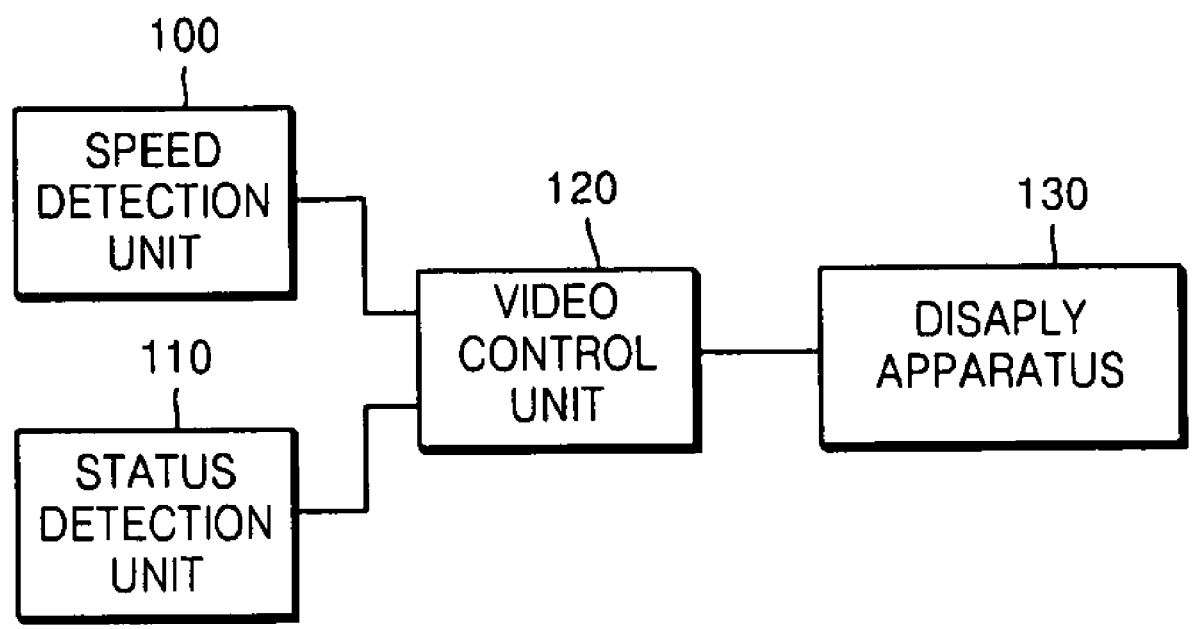
FIG. 1 is a block diagram of an apparatus for providing video content service in a vehicle according to an embodiment of the present invention.

FIG. 1 is a block diagram of an apparatus for providing video content service in a vehicle according to an embodiment of the present invention. In the embodiment, the apparatus includes a speed detection unit 100, a status detection unit 110, a video control unit 120, and a display apparatus 130.

The speed detection unit 100 detects a speed of the vehicle using a satellite tracking system. Examples of the satellite tracking system are a global positioning system (GPS), a GLONASS, and global navigation satellite system (GNSS). As an example of a method of the speed detection, a speed of the vehicle can be detected by dividing a difference between positions at two time points, which have been tracked by a GPS receiver installed in the vehicle, by a difference between the two time points. When the installed GPS receiver includes a function of speed detection of a vehicle, the speed detection unit 100 simply provides a speed which has been detected by the installed GPS receiver to the video control unit 120.

The status detection unit 110 detects a status of a parking brake. In other words, the status detection unit 110 determines whether the parking brake is applied or not and provides information on the status of the parking brake to the video control unit 120.

The video control unit 120 controls a display apparatus 130 based on outputs of the speed detection unit 100 and the status detection unit 110 so that video contents are displayed when the speed of the vehicle is determined to be at a speed less than a predetermined speed. In other words, whether driving of the vehicle is in a suitable status for safety driving is checked based on the information on the status of the detected parking brake and the detected speed of the vehicle to determine whether or not to display the video contents. More specifically, the information on the status of the parking brake has a priority, and when the parking brake is applied, the display apparatus 130 is controlled to display the video contents regardless of the information on the detected speed of the vehicle. Here, the predetermined speed is a speed at which a driver can drive the vehicle safely while watching the video contents, and a speed set by a traffic regulation may be the predetermined speed. When there are multiple display apparatuses 130 at different locations in the vehicle, whether to display the video contents on the display apparatus 130 for the driver should be determined based on the outputs of the speed detection unit 100 and the status detection unit 110 for a safe driving, while the video contents may be provided continuously to display apparatuses at other locations regardless of the outputs of the speed detection unit 100 and the status detection unit 110, since the display apparatuses are not related to the safe driving.

The display apparatus 130 is installed at one or more locations and displays the video contents according to control of the video control unit 120.

Figure 2:
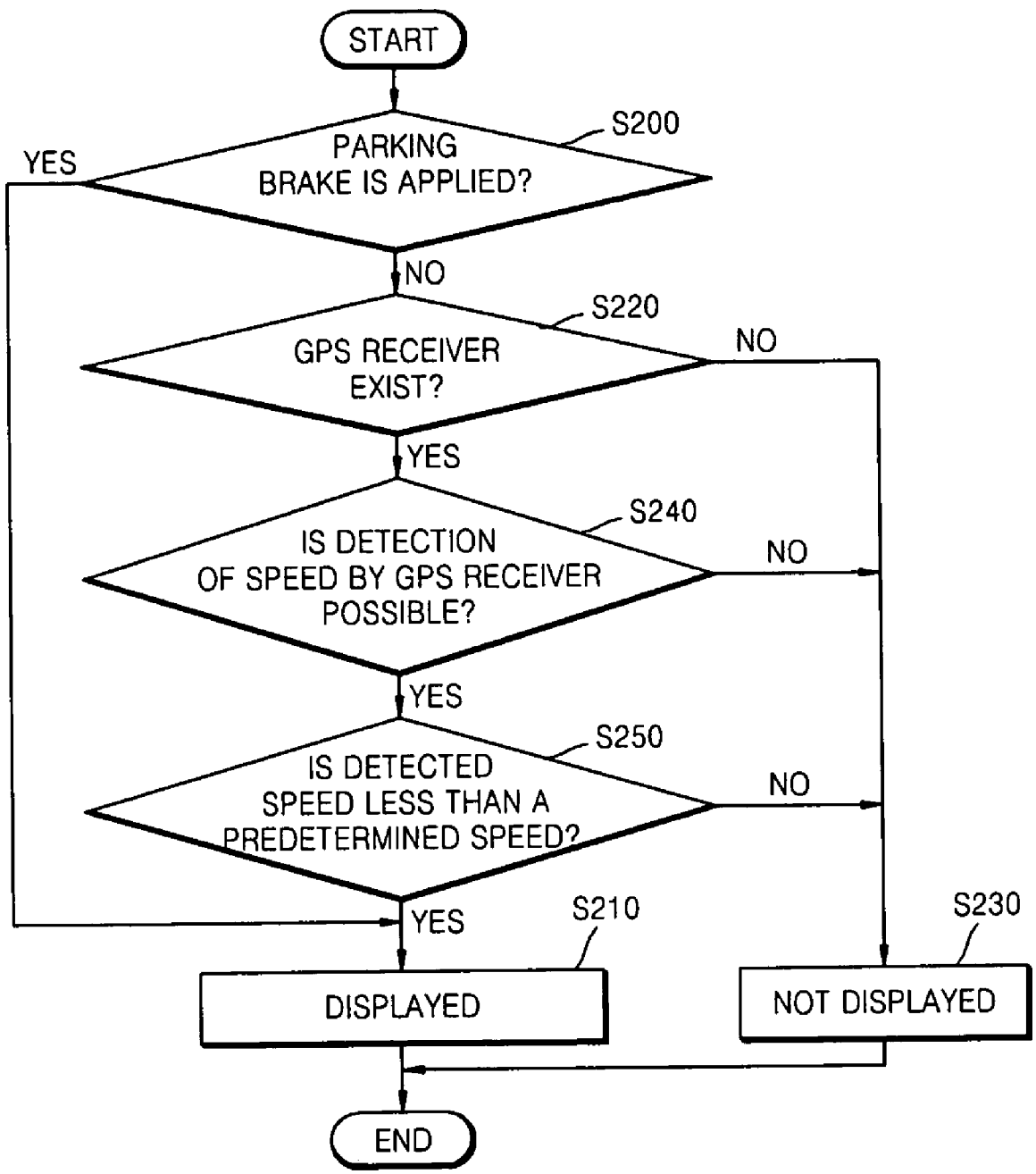
FIG. 2 is a flowchart of operations of an apparatus and a method for providing video content service in the vehicle.

FIG. 2 is a flowchart of operations of an apparatus and a method for providing the video contents in the vehicle.

First, whether the parking brake is applied or not is determined by the video control unit 120 based on information on the status of the parking brake which has been provided by the status detection unit 110 (S200).

When the parking brake is determined to be applied (S200), the vehicle is in a status of stop or parking, so the terminal having audio and visual functions, that is the display apparatus 130, is controlled by the video control unit 120 to display continuously the video contents, so that the driver and passengers can use audio or video content services (S210).

On the other hand, when the parking brake is determined not to be applied (S200), whether or not the GPS receiver exists is checked by the video control unit 120 (S220). When the GPS receiver is determined not to exist (S220), it is assumed that the GPS receiver is removed illegally by the driver, and the display apparatus 130 is controlled not to display the video contents by the video control unit 120 (S230). When the GPS receiver is determined to exist (S220), whether GPS data is valid or not is checked by the video control unit 120 (S240). In other words, it is determined whether a speed can be detected properly from the GPS receiver. When the data cannot be received from the GPS receiver in such a case as when the vehicle is in a tunnel or between buildings, information of a status indicator indicating that the GPS data is invalid is transmitted from the GPS receiver. When the GPS data is determined to be invalid (S240), the display apparatus 130 is controlled not to provide the video contents by the video control unit 120 (S230). In addition, when the data cannot be received from the GPS receiver in such a case as when the vehicle is in a basement parking lot, generally the parking brake is applied, so the video contents can be displayed on the display apparatus 130.

On the other hand, when the GPS data is valid (S240), the speed of the vehicle is detected using a signal from the GPS receiver by the speed detection unit 100, and it is determined by the video control unit 120 whether the detected speed is below the predetermined speed (S250). When the detected speed is determined to be below the predetermined speed (S250), the terminal monitor terminal having audio and visual functions, that is the display apparatus 130, is controlled by the video control unit 120 so that the video contents are displayed for providing audio-visual services to the driver and the passenger. On the other hand, when the detected speed is determined to be equal to or above the predetermined speed (S250), the display apparatus 130 is controlled by the video control unit 120 so that the video contents are not displayed (S230). Here, the predetermined speed is a speed at which a driver can drive safely while watching the video contents, and a speed set by a traffic regulation may be the predetermined speed.

Figure 3:
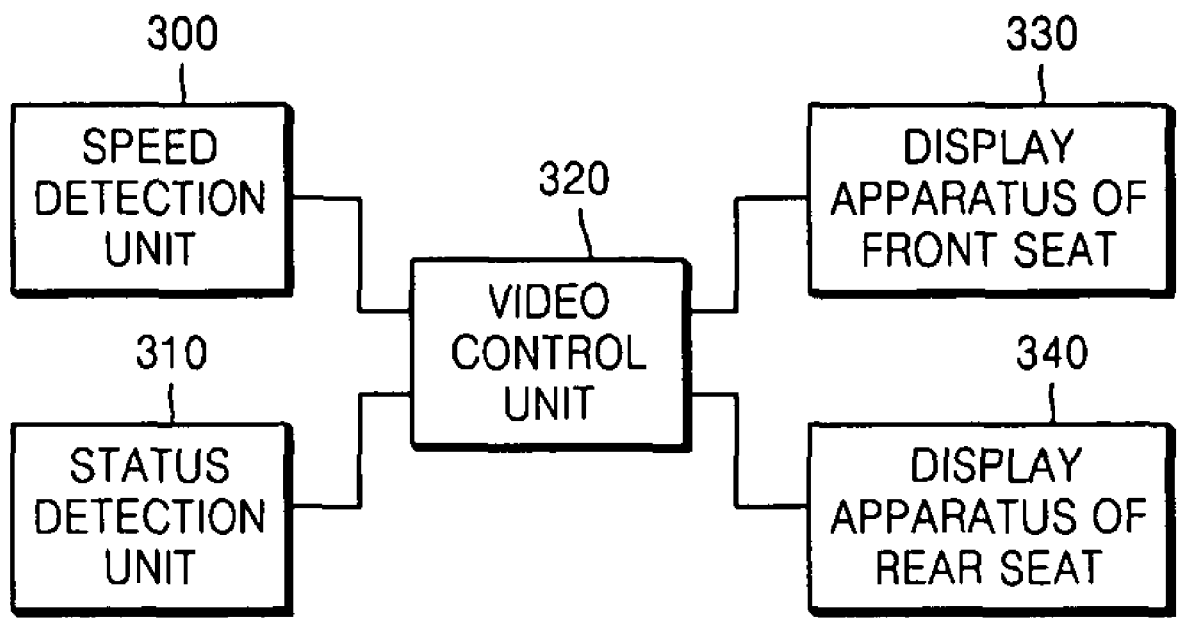
FIG. 3 is a block diagram of the apparatus for providing the video content service in the vehicle which includes display apparatuses in front and rear seats according to an embodiment of the present invention.

FIG. 3 is a block diagram of an apparatus for providing video content service in a vehicle which includes display apparatuses in front and rear seats according to an embodiment of the present invention. In the embodiment, the apparatus includes a speed detection unit 300, a status detection unit 310, a video control unit 320, a display apparatus 330 of a front seat, and a display apparatus 340 of a rear seat.

Functions of the speed detection unit 300 and the status detection unit 310 are the same as the speed detection unit 100 and the status detection unit 110 in FIG. 1, and description of the units 300 and 310 are omitted. The video control unit 320 controls the display apparatuses 330 and 340 of the front and rear seats, and a method of controlling the display apparatus 330 of the front seat is the same as the method described above with reference to FIG. 1. The video control unit 320 enables the display apparatus 330 of the rear seat to operate all the time regardless of an application of a parking brake or a speed of the vehicle received from the GPS receiver, so that a passenger is provided with various services during the vehicle is in driving.

Figure 4:
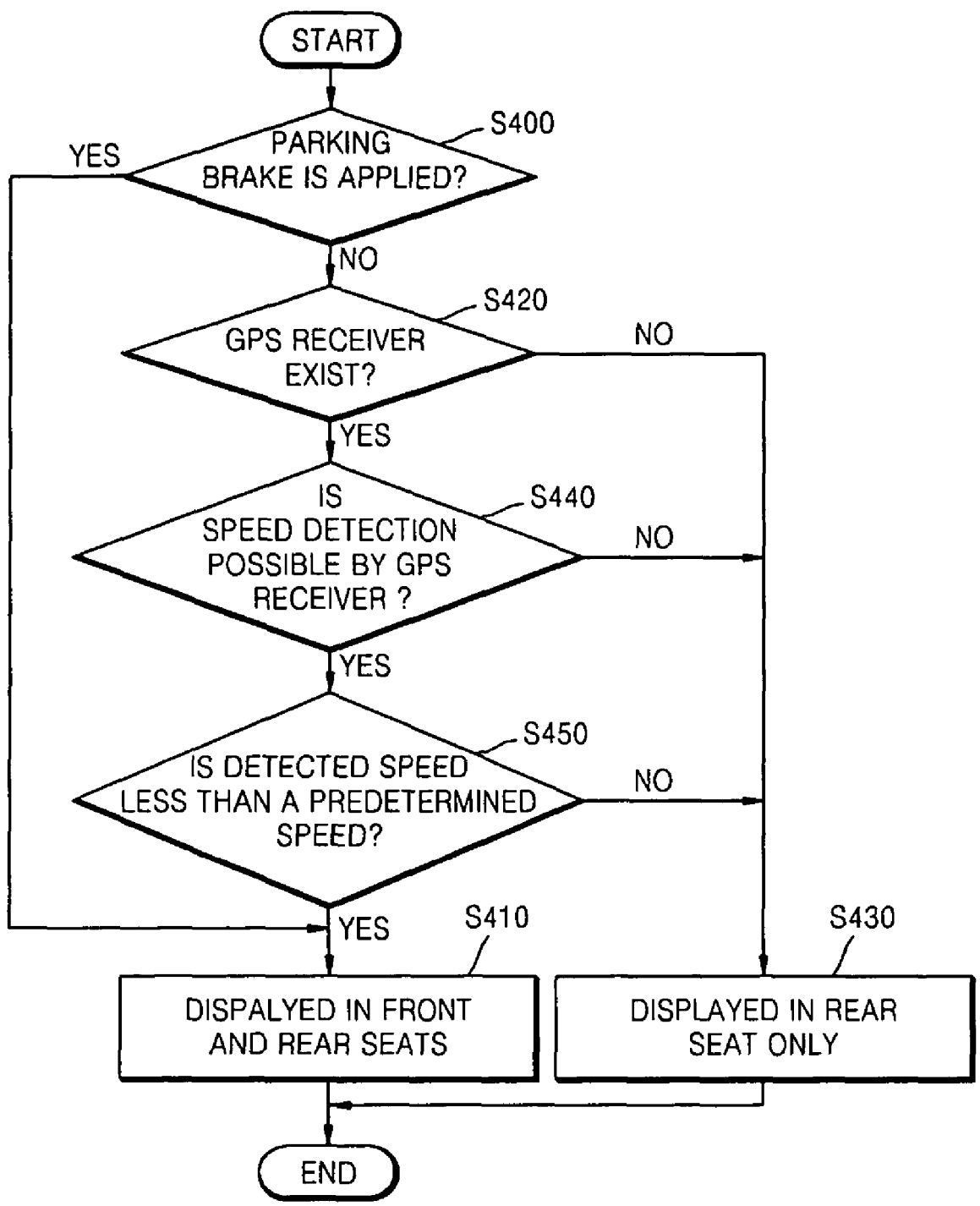
FIG. 4 is a flowchart of operations of the apparatus and the method for providing the video contents in the vehicle in which the display apparatuses of the front and rear seats are included according to an embodiment of the present invention.

FIG. 4 is a flowchart of operations of an apparatus and a method for providing video content service in a vehicle in which there are display apparatuses of front and rear seats according to an embodiment of the present invention.

Determination stages S400, S420, S440, and S450 are the same as the determination stages S200, S220, S240, and S250 in FIG. 2. When it is determined that a parking brake is applied (S400) or a detected speed is below a predetermined speed (S450), the display apparatuses 330 and 340 of the front and rear seats are controlled by the video control unit 320 so that the video contents are displayed at the same time on the display apparatuses 330 and 340 in the front and rear seats. When it is determined that a GPS receiver does not exist (S420), a speed detection is impossible (S440), or the detected speed is equal to or above the predetermined speed (S450), the display apparatuses 330 and 340 of the front and rear seats are controlled by the video control unit 320 so that the video contents are displayed on the display apparatus 340 of the rear seat only.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves such as data transmission through the Internet. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

According to the present invention, a safe driving of a vehicle and a driver's concentration on driving can be maintained by controlling video information displayed on a terminal monitor having audio and visual functions installed in a vehicle using a parking brake and a GPS receiver. In addition, the video contents are provided to monitors installed for passengers, other than the driver, regardless of the parking status and the speed of the vehicle, so that passengers not related to the safe driving can enjoy a motion picture conveniently without any limitation.

In addition, according to the present invention, when a display apparatus such as a terminal monitor having audio and visual functions is installed additionally, the speed detection of the vehicle is obtained from a commonly used navigator or a GPS receiver, there is no need to install an interface for receiving the speed information and compatibility of the display apparatus to be installed is improved, since there is no need to install a terminal for the speed detection.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for providing a video content service in a vehicle comprising:
    a speed detection unit detecting a speed of a vehicle using a global positioning system;
    a status detection unit detecting a status of a parking brake; and
    a video control unit configured to simultaneously control a plurality of display apparatuses so that the video content service is displayed on each of the display apparatuses when the speed of the vehicle is determined to be below a predetermined speed based on information on the detected status of the parking brake and the detected speed of the vehicle and the video content service is not displayed on at least one of the display apparatuses when it is determined that the global positioning system cannot detect the speed of the vehicle.

2. The apparatus of claim 1, wherein one or more of the plurality of display apparatuses are installed at least at one location in the vehicle, and
    the video control unit controls a display apparatus of the display apparatuses corresponding to a location of a driver only, based on the information on the detected status of the parking brake and the detected speed of the vehicle.

3. The apparatus of claim 1, wherein the video control unit controls the display apparatuses to display video contents when information on the status of the parking brake indicating that the parking brake is applied is received.

4. A method of providing a video content service in a vehicle, the method comprising:
    (a) detecting a speed of a vehicle using a global positioning system;
    (b) detecting a status of a parking brake; and
    (c) simultaneously controlling a plurality of display apparatuses installed in the vehicle so that video contents are displayed when the speed of the vehicle is determined to be below a predetermined speed based on the detected status of the parking brake and the detected speed of the vehicle; and
    wherein (c) comprises controlling the display apparatuses such that at least one of the display apparatuses do not display the video contents when it is determined that the global positioning system cannot detect the speed of the vehicle.

5. The method of claim 4, wherein the (c) comprises determining whether or not to display the video contents only on a display apparatus corresponding to a location of a driver based on the detected status of the parking brake and the detected speed of the vehicle.

6. The method of claim 4, wherein the (c) comprises controlling the display apparatus to display the video contents when the parking brake is determined to be applied.

7. The method of claim 4, wherein the (c) comprises determining whether or not to display the video contents based on the detected speed of the vehicle, when the parking brake is determined to be disengaged.

8. A computer readable medium having embodied thereon a computer program for the method of claim 4.

9. The apparatus of claim 1, wherein the predetermined speed is set by a traffic regulation.

10. The apparatus of claim 1, wherein at least one of the plurality of display apparatuses is positioned adjacent a rear seat of a vehicle and the video control unit enables the at least one display apparatus to operate at all times regardless of whether the speed of the vehicle is determined to be below a predetermined speed based on information on the detected status of the parking brake and the detected speed of the vehicle.

* * * * *